United States Patent
Kobatake et al.

(10) Patent No.: US 10,562,382 B2
(45) Date of Patent: Feb. 18, 2020

(54) VEHICLE SLIDING DOOR

(71) Applicant: HONDA MOTOR CO., LTD., Tokyo (JP)

(72) Inventors: Takahito Kobatake, Wako (JP); Masato Asakura, Wako (JP); Tomoaki Ando, Wako (JP); Kenji Kudo, Tochigi (JP); Katsuhiro Yoshiyama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/021,232

(22) Filed: Jun. 28, 2018

(65) Prior Publication Data

US 2019/0001796 A1  Jan. 3, 2019

(30) Foreign Application Priority Data

Jun. 30, 2017 (JP) ................................. 2017-128142

(51) Int. Cl.
  *B60J 5/06* (2006.01)
  *B60J 1/17* (2006.01)
  *B60J 5/04* (2006.01)

(52) U.S. Cl.
  CPC . *B60J 5/06* (2013.01); *B60J 1/17* (2013.01); *B60J 5/045* (2013.01); *B60J 5/0416* (2013.01)

(58) Field of Classification Search
  CPC ..... B60J 5/06; B60J 1/17; B60J 5/0416; B60J 5/045
  USPC ........................................................ 296/155
  See application file for complete search history.

(56) References Cited

U.S. PATENT DOCUMENTS

| 7,669,368 | B2 * | 3/2010 | Kuhnen ..................... | B60J 5/06 296/155 |
| 2005/0046230 | A1 * | 3/2005 | Fukumoto .............. | B60J 5/0416 296/155 |

FOREIGN PATENT DOCUMENTS

| JP | 2005-335412 A | 12/2005 |
| JP | 2006-088992 A | 4/2006 |
| JP | 2013-112058 A | 6/2013 |

OTHER PUBLICATIONS

Japanese Office Action dated Jan. 8, 2019, 6 pages.

* cited by examiner

*Primary Examiner* — Joseph D. Pape
(74) *Attorney, Agent, or Firm* — Rankin, Hill & Clark LLP

(57) ABSTRACT

A vehicle sliding door, including: an outer panel; an inner panel; a module panel to which devices are fixed; a first reinforcement member for reinforcing a sliding-direction end portion of the inner panel; and a fixation part to which the inner panel, the module panel and the first reinforcement member are fixed is provided.

5 Claims, 4 Drawing Sheets

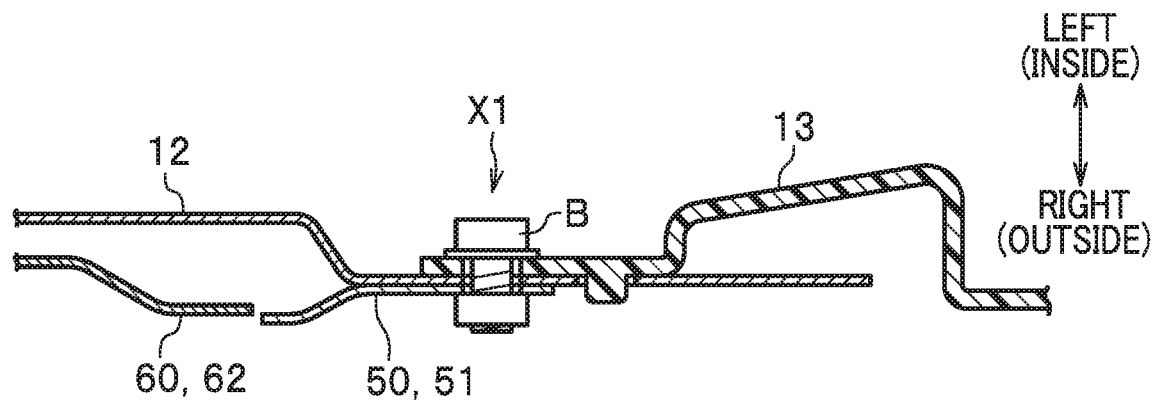
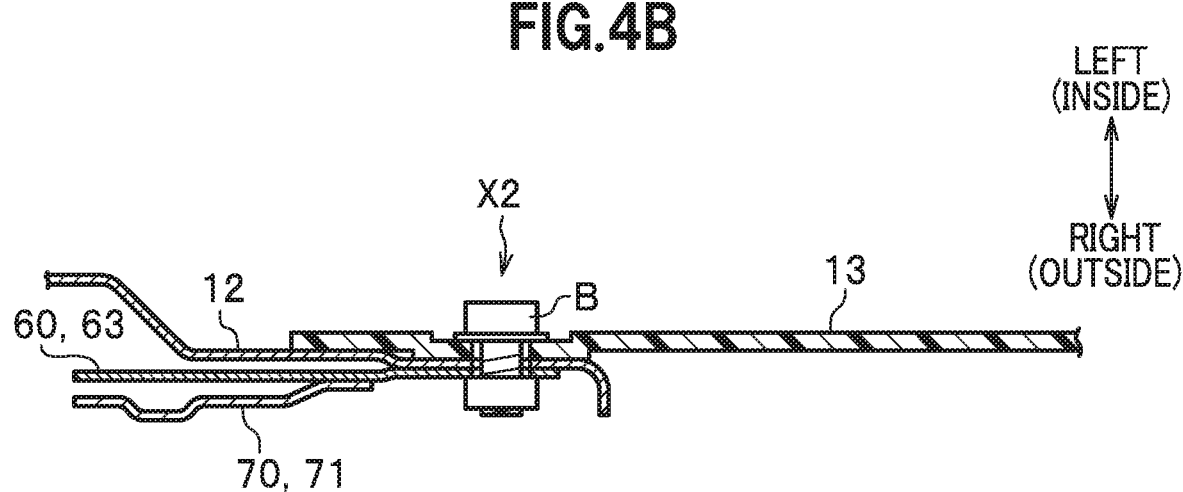
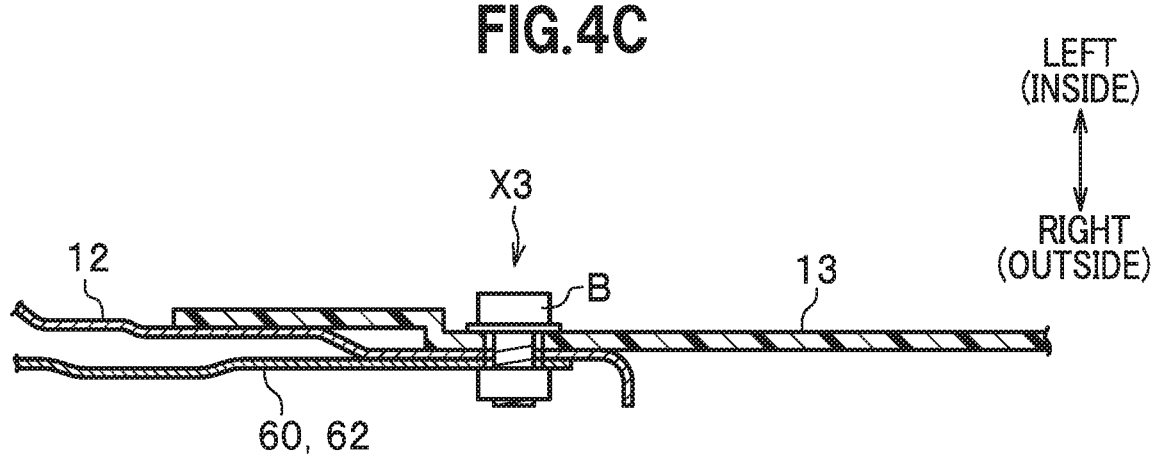

VEHICLE SLIDING DOOR

BACKGROUND OF THE INVENTION

1. Field of the Invention

The present invention relates to a vehicle sliding door.

2. Description of the Related Art

A requirement for a vehicle sliding door is rigidity which does not allow the door to deform or to open unexpectedly when load is applied to the door surface. Patent Literature 1 discloses a structure of a vehicle sliding door in which reinforcement members are provided to parts of an inner panel to which to attach latch mechanisms and rollers.

PRIOR ART DOCUMENT(S)

Patent Literature(s)

Patent Literature 1: JP 2005-335412 A

SUMMARY OF THE INVENTION

To simplify the production of the vehicle sliding door, a module panel to which a window glass lifting/lowering device and the like are fixed in advance is prepared, and the module panel is attached to the inner panel. It is similarly desired that rigidity of the vehicle sliding door with such a structure be increased.

With the above point taken into consideration, the present invention has been made to solve the above problems, and an object thereof is to provide a vehicle sliding door whose structure includes a module panel, and whose rigidity can be enhanced.

In order to achieve the above object, the vehicle sliding door according to the present invention includes an outer panel and an inner panel. The vehicle sliding door further includes: a module panel to which devices are fixed; and a first reinforcement member for reinforcing a sliding-direction end portion of the inner panel, and a fixation part to which the inner panel, the module panel and the first reinforcement member are fixed.

According to the present invention, it is possible to provide a vehicle sliding door whose structure includes a module panel, and whose rigidity can be enhanced.

BRIEF DESCRIPTION OF THE DRAWINGS

FIG. 4A is an end view of the inner panel, the module panel and two of the reinforcement members taken along the IVa-IVa line of FIG. 3;

FIG. 4B is an end view of the inner panel, the module panel and two the reinforcement members taken along the IVb-IVb line of FIG. 3 and FIG. 4C is an end view of the inner panel, the module panel and one the reinforcement members taken along the IVc-IVc line of FIG. 3.

DETAILED DESCRIPTION OF THE EMBODIMENTS

Embodiments for carrying out the present invention (embodiments) will be hereinafter described in detail with reference to the accompanying drawings. A vehicle sliding door according to the present invention will be described by citing sliding doors to be arranged on each of the left and right sides of a rear part of a vehicle. Front, rear, up and down directions in the following descriptions for the vehicle sliding door are directions from a driver seated in the driver's seat in the vehicle, and are based on the front, rear, up and down direction indicated with the respective arrows in FIG. 1.

Figure 1:
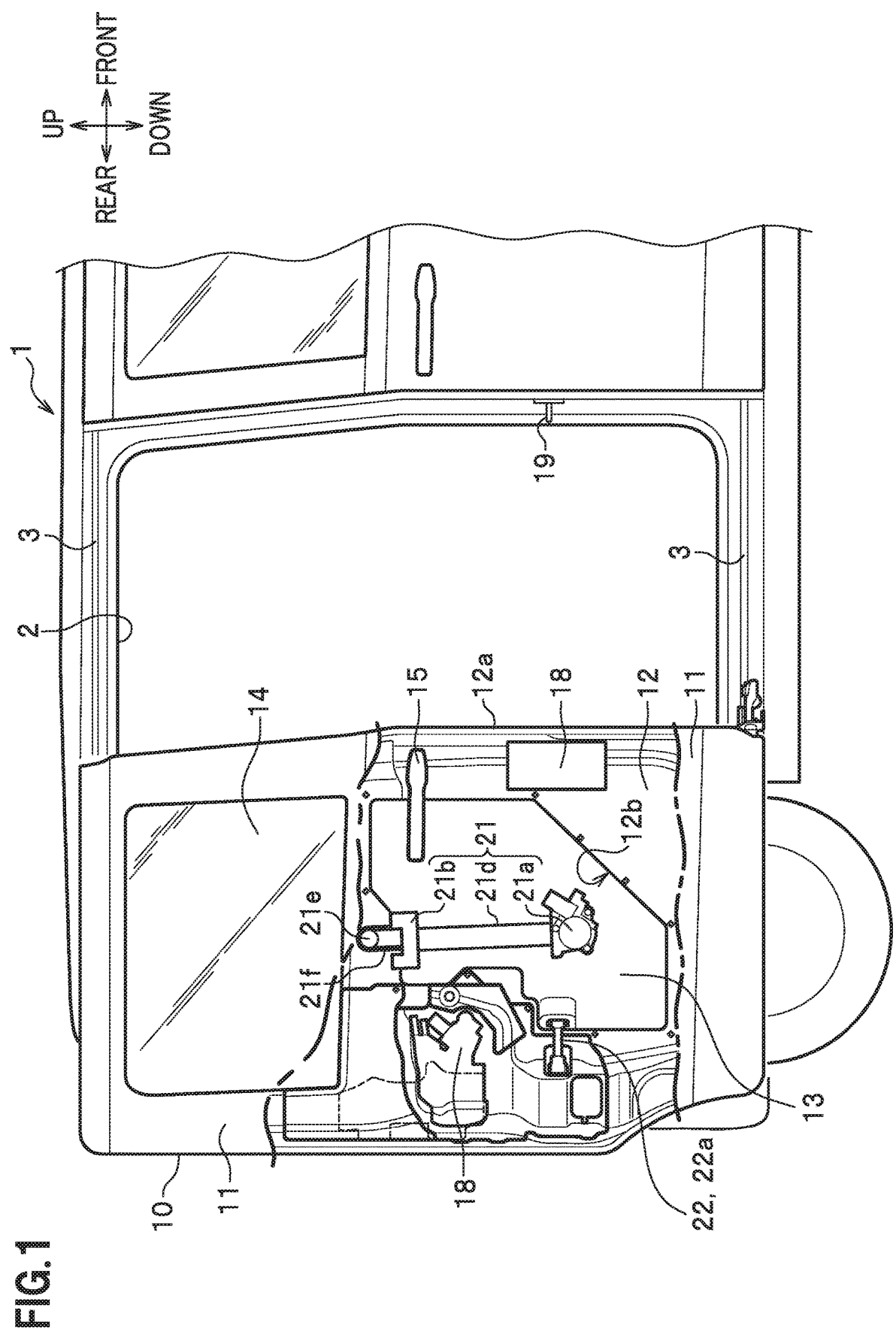
FIG. 1 is a side view of a right part of a vehicle including a vehicle sliding door according to an embodiment of the present invention.

FIG. 1 is a side view of a right part of the vehicle 1 including a vehicle door 10 (hereinafter referred to as a sliding door 10, or a vehicle sliding door 10) according to an embodiment of the present invention. Incidentally, in the embodiment, the pair of left and right sliding doors 10 have their respective structures which are left-right symmetrical with respect to a vehicle center line extending in the front-rear direction, and descriptions will be provided for only the right sliding door 10. Descriptions for the left sliding door 10 will be omitted. For the sake of drawing convenience, in FIG. 1, parts of an outer panel 11 of the sliding door 10 are selectively cut away to make the internal structure of the sliding door 10 visible. Incidentally, in FIG. 1, a handle member 15 located on a vehicle outer side of the cut-away outer panel 10 is drawn with a solid line.

As illustrated in FIG. 1, the sliding door 10 is installed in an entrance/exit 2 of the vehicle 1.

Figure 2:
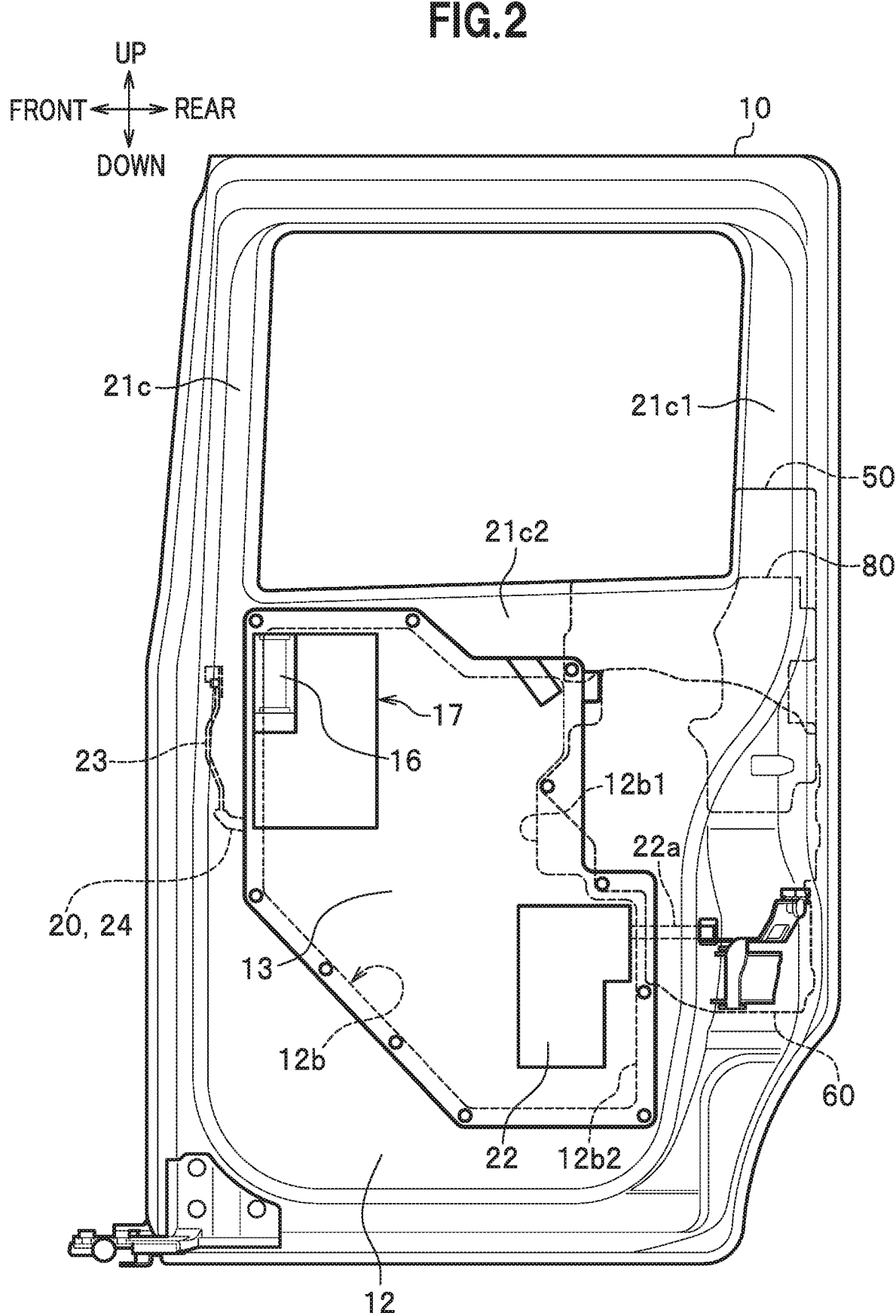
FIG. 2 is a side view of the vehicle sliding door according to the embodiment of the present invention from inside the vehicle.

The door 10 moves in the front-rear direction along door rails 3 attached to the vehicle 1, within a range between a fully-closed state (not illustrated) and a fully-opened state (illustrated in FIG. 2). In this respect, the fully-closed state is that in which the sliding door 10 closes the entrance/exit 2, while the fully-opened state is that in which the sliding door 10 fully opens the entrance/exit 2.

The entrance/exit 2 of the vehicle 1 is formed with a vehicle width-direction depth depending on a vehicle width-direction thickness of the sliding door 10 such that while the sliding door 10 is in the fully-closed state, the side surface of the vehicle 1 is substantially level. In this respect, the vehicle width direction coincides with a direction vertical to the sheet on which FIG. 1 is drawn.

The sliding door 10 includes an outer panel 11, an inner panel 12, a module panel 13 and a window glass 14. An interior panel (not illustrated) is attached to the inner side (interior side) of the inner panel 12. In FIG. 1, reference sign 12b denotes an opening part of the inner panel 12 into which the module panel 13 is fitted, as discussed later.

The outer panel 11 is arranged on the exterior side of the sliding panel 10, and forms an outer design surface of the sliding panel 10.

The inner panel 12 is arranged on the interior side of the outer panel 11 with a predetermined space in between. The front and rear end portions of the inner panel 12 have wall parts 12a, 12a which are formed by bending the inner panel 12 toward the outer panel 11.

These wall parts 12a, 12a are formed facing in the front-rear direction of the inner panel 12. In other words, the wall parts 12a, 12a form the front and rear end surfaces of the sliding door 10 which intersect the vehicle front-rear direction. Incidentally, the outer panel 11 and the inner panel 12 can be joined together, for example, by a process such as a hemming process in which edge portions of the outer panel 11 is folded toward the inner panel 12.

Lock devices 18, 18 are arranged between the inner panel 12 and the outer panel 11, but in parts of the sliding door 10 which are near its front and rear edges. Although not illustrated, another lock device 18 is provided to a part of the sliding door 10 which is near its lower edge. These lock devices 18 respectively engage with and disengage from engagement members 19 provided to the entrance/exit 2 depending on manipulations of a handle member 15 to turn on and off a door opening/closing mechanism 17 (see FIG. 2), which will be discussed later. Incidentally, FIG. 1 illustrates only the engagement member 19 which engages with and disengages from the lock device 18 provided to the part of the sliding door 10 which is near its front edge, and omits the other two engagement members 19 which engage with and disengage from the remaining lock devices 18 for the sake of drawing convenience.

In FIG. 1, reference sign 21 denotes a window glass lifting/lowering device.

The window glass lifting/lowering device 21 works as follows. Once a cable 21d is wound by a drum 21a which is rotated by a motor (not illustrated), a carrier 21b attached to the lower end of the widow glass 14 moves in the up-down direction depending on the rotation direction of the drum 21a. Thereby, the window glass lifting/lowering device 21 lifts and lowers the window glass 14 within a predetermined movement range. Incidentally, in FIG. 1, reference sign 21f denotes a pulley holding member which holds a pulley 21e at an upper edge portion of the module panel 13 with the cable 21d wound around the pulley 21e. The pulley holding member 21f according to the embodiment is formed from a plate body which is shaped like a tongue in a plan view. The pulley holding member 21f extends from its base end at a side of the module panel 13 to its distal end through the interstice between the inner panel 12 and the outer panel 11. The pulley holding member 21f holds the pulley 21e using its distal end portion.

The drum 21a of the window glass lifting/lowering device 21 is attached to an outer panel 11 side of the module panel 13. When lowered together with the carrier 21b, the window glass 14 is laid between the outer panel 11 and the inner panel 12 to which the module panel 13 is attached.

In FIG. 1, reference sign 24 denotes a lever member of a rod connector 20, which will be discussed later. The lever member 24 is attached to a front edge portion of the module panel 13. Reference sign 22a denotes an extending part of a power sliding door unit 22. The extending part 22a further extends out beyond a rear edge portion of the module panel 13 toward the rear.

Like the pulley holding member 21f, the lever member 24 and the extending part 22a extend out from the side of the module panel 13 into the interstice between the inner panel 12 and the outer panel 11 through the opening part 12b of the inner panel 12.

FIG. 2 is a side view of the sliding door 10 from inside the vehicle. Incidentally, for the sake of drawing convenience, FIG. 2 omits the above-mentioned interior panel attached to the interior side of the sliding door 10. Furthermore, the handle member 15 arranged on the outer side of the outer panel 11 (see FIG. 1), the lever member 24 of the rod connector 20 extending between the outer panel 11 and the inner panel 12, the extending part 22a of the power sliding door unit 22, and a rod 23 are indicated with hidden outlines (dotted lines).

As illustrated in FIG. 2, the module panel 13 is formed from a resin-made plate body which extends in the sliding door 10 substantially shaped like a vertically long rectangle in a plan view, particularly along a diagonal line from an upper front portion to a lower rear portion of the sliding door 10 under a window frame 21c.

The module panel 13 is provided so as to cover the opening part 12b, which is formed in the inner panel 12, from inside the vehicle. Incidentally, in FIG. 2, the opening part 12b is indicated with a hidden outline (dotted line).

The power sliding door unit 22 and the door opening/closing mechanism 17 are attached to the interior side of the module panel 13.

Although not illustrated, the power sliding door unit 22 includes a motor-driven drum, and a cable wound around the drum with the distal ends of the extended cable attached to the vehicle body. The power sliding door unit 22 moves the sliding door 10 in the front-rear direction depending on the rotational direction of the drum. Reference sign 22a denotes the extending part working as an outer casing for the cable which, as discussed above, extends from the drum toward the rear.

The door opening/closing mechanism 17 includes: an actuator (whose illustration is omitted) which outputs a driving force for making the lock devices 18 (see FIG. 1) engage with and disengage from the engagement members 19 (see FIG. 1), based on manipulation force which the user inputs into the door opening/closing mechanism 17 by manipulating the handle member 15; and a transmission mechanism (not illustrated) which transmits the output from the actuator to the lock devices 18.

The door opening/closing mechanism 17 according to the embodiment is assumed as including: the actuator which generates pulling force based on the manipulation of the handle member 15; and the transmission mechanism (not illustrated) which includes cables and the like for transmitting the pulling force to the lock devices 18 (see FIG. 1). The door opening/closing mechanism 17 is not limited to this example. The door opening/closing mechanism 17 may for example include: the lock devices 18 (see FIG. 1) which is electromagnetically driven to engage with and disengage from the engagement members 19 (FIG. 1); and a controller which outputs ON and OFF electrical signals to the lock devices 18 based on the manipulation force inputted via the handle member 15.

In FIG. 2, reference sign 16 denotes an inner handle arranged on the vehicle inner sides. The inner handle 16 is attached to the module panel 13 so that the inner handle 16 faces the inside of the vehicle compartment. The user, therefore, can manipulate the door opening/closing mechanism 17 from inside the vehicle compartment.

(Shape of Opening Part of Inner Panel (Module Panel))

Figure 3:
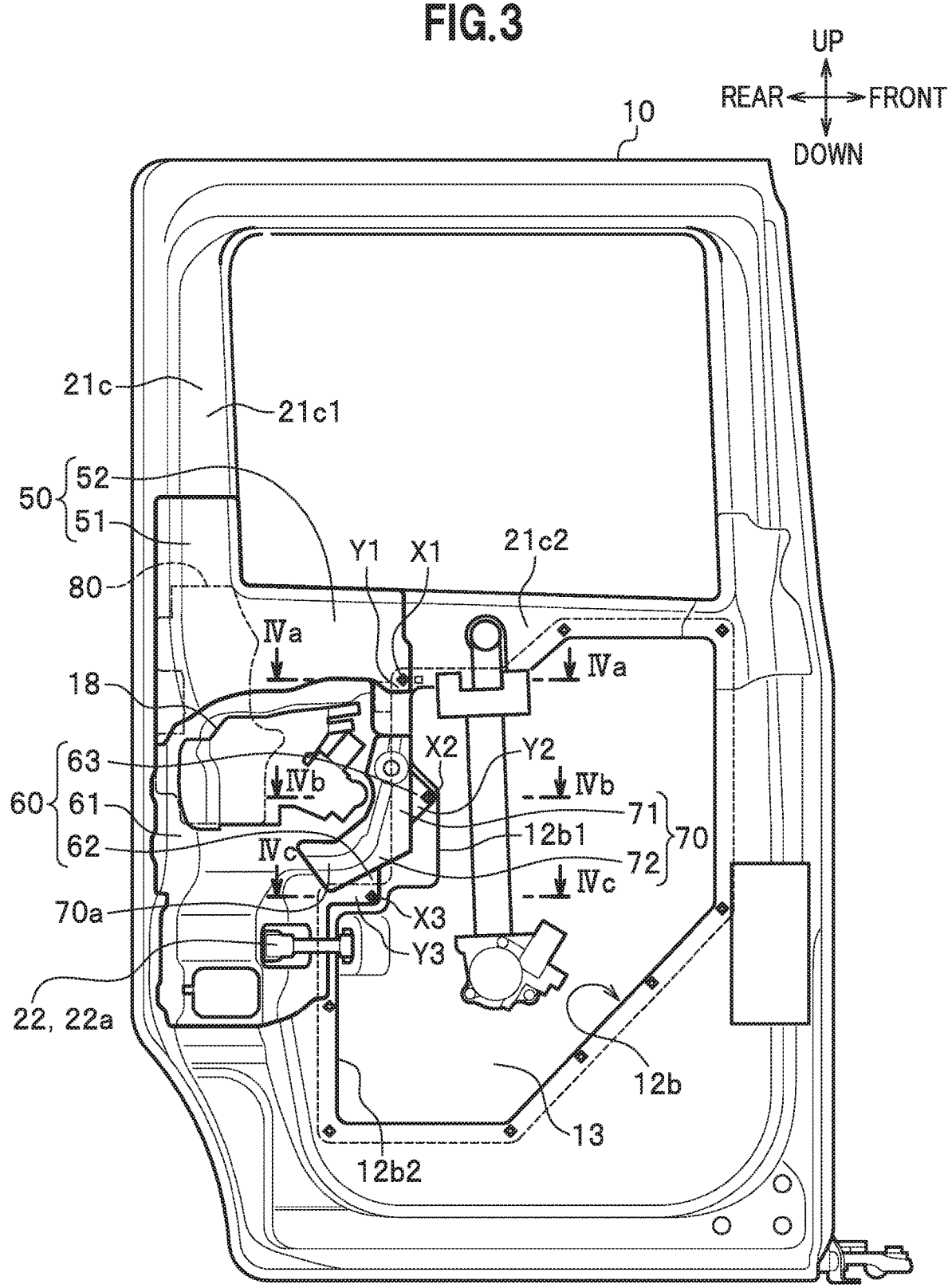
FIG. 3 is a side view of an inner panel, a module panel and reinforcement members of the vehicle sliding door according to the embodiment of the present invention from outside the vehicle.

Descriptions will be hereinbelow provided for the shape of the opening part 12b of the inner panel 12 (or the module panel 13). As illustrated in FIG. 3, steps are formed in the rear end portion of the opening part 12b of the inner panel 12. To put it specifically, the edge portion of the rear end portion of the opening part 12b includes a first edge part 12b1 as an upper edge part, and a second edge part 12b2 as a lower edge part. The first edge part 12b1 has a shape which becomes gradually more bent in a door sliding direction (the front-end direction) toward its bottom from its top. The second edge part 12b2 is located closer to a rear end portion of the inner panel 12 than the first edge part 12b1 is. The module panel 13 has a shape which corresponds to the first edge part 12b1 and the second edge part 12b2. Since the opening part 12b includes the second edge part 12b2, the power sliding door unit 22 provided to the module panel 13 can be arranged closer to the opening-direction end portion (the rear end portion) of the vehicle sliding door 10 than otherwise, and the extending part 22a can be accordingly shorter in length than otherwise.

(Module Panel)

The module panel 13 is a resin-made panel member. As devices, the power sliding door unit 22, the lock devices 18, 18 of the door opening/closing mechanism 17 are beforehand fixed to the interior surface of the panel 13, while the window glass lifting/lowering device 21 is beforehand fixed to the exterior surface of the panel 13. Since the multiple devices are fixed to the module panel 13, the module panel 13 is large in size. For the purpose of securing rigidity of the module panel 13 as a single unit, therefore, the module panel 13 is made of fiber-reinforced plastic (FRP). The module panel 13 is attached to the inner panel 12 with the opening part 12b covered with the module panel 13 from inside the vehicle. Due to this attachment, the window glass lifting/lowing device 21 beforehand fixed to the module panel 13 is arranged in a space between the inner panel 12 and the outer panel 11.

As illustrated in FIG. 3, the vehicle sliding door 10 according to the embodiment of the present invention includes: a sash stiffener 50 and a latch stiffener 60 as a first reinforcement member which reinforces a sliding-direction end portion (a rear end portion which is an opening-direction end portion, in this embodiment) of the inner panel 12; a sub-stiffener 70 as a second reinforcement member which reinforces a predetermined portion of the inner panel 12; and a patch member 80.

(Sash Stiffener)

The sash stiffener 50 is a metal-made plate-shaped member which reinforces the rear end portion of the inner panel 12, particularly a lower end portion of a vertical frame part 21c1, a rear part of the window frame 21c, and a rear end portion of a horizontal frame part 21c2, a lower part of the window frame 21c. The sash stiffener 50 is provided along a vehicle width-direction outer side surface of the inner panel 12, and is joined to the inner panel 12 by spot-welding or the like. In a side view (a view from the outside in the vehicle width direction), the sash stiffener 50 is substantially shaped like the letter L. The sash stiffener 50 integrally includes a vertical side part 51 extending in the up-down direction, and a horizontal side part 52 extending from a lower end portion of the vertical side part 51 toward the front.

The vertical side part 51 is provided along the lower end portion of the vertical frame part 21c1 in the inner panel 12. The horizontal side part 52 is provided along the rear end portion of the horizontal frame part 21c2 in the inner panel 12. A front end portion of the horizontal side part 52 is arranged near the first edge part 12b1 of the opening part 12b in the inner panel 12.

(Latch Stiffener)

The latch stiffener 60 is a metal-made plate-shaped member which reinforces the rear end portion of the inner panel 12, particularly a part thereof which is provided with the lock device (lock mechanism) 18 serving as a latch. The latch stiffener 60 is provided along the vehicle width-direction outer side surface of the inner panel 12, and is joined to the inner panel 12 by spot-welding or the like. The latch stiffener 60 integrally includes: a vertical side part 61 extending in the up-down direction; a first extending part 62 extending from an upper portion of a front end portion of the vertical side part 61 toward the front; and a second extending part 63 extending from a height-direction middle portion of a front end portion of the first extending part 62 toward the front.

The vertical side part 61 has a width which coincides with an interval between the rear end portion of the inner panel 12 and the second edge part 12b2 of the opening part 12b. A front end part of the first extending part 62 is located further forward than the second edge part 12b2 of the opening part 12b, and is located near the first edge part 12b1. The second extending part 63 is substantially shaped like a triangle. A front end portion (vertex portion) of the second extending part 63 is located near the first edge part 12b1.

(Sub-Stiffener)

The sub-stiffener 70 is a metal-made plate-shaped member which reinforces parts of the inner panel 12 which correspond to the extending parts 62, 63, that is to say, peripheral edge portions (front and lower edge portions) of apart of the inner panel 12 which is provided with the lock device 18. The sub-stiffener 70 is provided along a vehicle width-direction outer side surface of the latch stiffener 60, and is joined to the inner panel 12 and the latch stiffener 60 by spot-welding or the like. In a side view (a view from the inside in the vehicle width direction), the sub-stiffener 70 is substantially shaped like the letter L. The sub-stiffener 70 integrally includes a vertical side part 71 extending in the up-down direction, and a horizontal side part 72 extending from a lower end portion of the vertical side part 71 toward the rear.

The vertical side part 71 is located further forward than the lock device 18, and is provided over the second extending part 63 in the up-down direction. The horizontal side part 72 is located lower than the lock device 18, and is provided overlapping the first extending part 62.

In addition, a bead part 70a extending from the vertical side part 71 to the horizontal side part 72 and shaped like the letter L is formed in the sub-stiffener 70. The bead part 70a is a part projecting inward in the vehicle width direction, and increases the rigidity of the sub-stiffener 70 serving as the second reinforcement member.

(Patch Member)

A patch member 80 is a metal-made plate-shaped member which reinforces a part of the inner panel 12 which is provided with the lock device 18. The patch member 80 is provided along the vehicle width-direction outer side surface of the inner panel 12 among the sash stiffener 50, the latch stiffener 60 and the inner panel 12. The patch member 80 is joined to the inner panel 12 by spot-welding or the like. In a view from inside the vehicle, an upper portion of the patch member 80 overlaps the sash stiffener 50, while a lower portion of the patch member 80 overlaps the latch stiffener 60.

(Fixing Structure for Inner Panel, Module Panel and Stiffeners)

As illustrated in FIG. 3, the peripheral edge portion of the opening part 12b of the inner panel 12 is overlaid with the peripheral edge portion of the module panel 13 from the inside in the vehicle width direction. In their parts are placed one on the other, the module panel 13 and the inner panel 12 are fixed together using bolts B or the like which are inserted from inside the vehicle.

In the embodiment, together with the inner panel 12 and the module panel 13, the sash stiffener 50 and the latch stiffener 60 both serving as the first reinforcement member are fixed together in multiple fixation parts X1 to X3 which are vertically spaced apart from each other.

In this respect, a front lower end portion of the horizontal side part 52 of the sash stiffener 50 overlaps in the vicinity of a rear upper end portion of the module panel 13 and a rear upper end portion of the opening part 12b of the inner panel 12. In their parts placed one on another, the inner panel 12, the module panel 13 and the sash stiffener 50 are fixed together using a bolt B and the like from inside the vehicle (the three members fastened together in the upper fixation part X1, see FIG. 4A). Furthermore, in the vicinity of the fixation part X1, the inner panel 12 and the sash stiffener 50 are joined together by spot-welding or the like (a weld part Y1).

Meanwhile, the front end portion (the vertex portion) of the second extending part 63 of the latch stiffener 60 overlaps the vicinity of a rear end portion of the module panel 13 and the first edge part 12b1 of the opening part 12b of the inner panel 12. In their parts placed one on another, the inner panel 12, the module panel 13 and the latch stiffener 60 are fixed together using a bolt B and the like from inside the vehicle (the three members fastened together in the middle fixation part X2, see FIG. 4B). Furthermore, in the vicinity of the fixation part X2, the inner panel 12 and the latch stiffener 60 are joined together by spot-welding or the like (a weld part Y2).

Meanwhile, the front lower end portion of the first extending part 62 of the latch stiffener 60 overlaps the vicinity of the rear end portion of the module panel 13 and the first edge part 12b1 of the opening part 12b of the inner panel 12. In their parts placed one on another, the inner panel 12, the module panel 13 and the latch stiffener 60 are fixed together using a bolt B and the like from inside the vehicle (the three members fastened together in the lower fixation part X3, see FIG. 4C). Furthermore, in the vicinity of the fixation part X3, the inner panel 12 and the latch stiffener 60 are joined together by spot-welding or the like (a weld part Y3).

In the vehicle sliding door 10 according to the embodiment of the present invention, the inner panel 12, the module panel 13 and the first reinforcement member (the sash stiffener 50 and the latch stiffener 60) are fixed together in the fixation parts X1 to X3. This makes it possible to use the large-sized module panel 13 with the sufficient rigidity as a rigidity member, and to accordingly increase the door rigidity.

In addition, in the vehicle sliding door 10, the multiple fixation parts X1 to X3 are provided with a space interposed between each two fixation parts neighboring in the up-down direction. This makes it possible to preferably increase the door rigidity over the wide range of the door surface in the up-down direction.

Furthermore, in the vehicle sliding door 10, the first reinforcement member is divided into the sash stiffener 50 as the upper reinforcement member and the latch stiffener 60 as the lower reinforcement member. This makes it possible to enhance freedom in the plate thickness, shape, layout and the like of the first reinforcement member, and to accordingly increase the door rigidity while inhibiting an increase in the weight.

Moreover, in the vehicle sliding door 10, the latch stiffener 60 serving as the first reinforcement member includes the extending parts 62, 63. This makes it possible to preferably set the fixation parts X2, X3 depending on the shapes of the opening part 12b and the module panel 13.

Besides, in the vehicle sliding door 10, the second reinforcement member (the sub-stiffener 70) reinforces the parts of the inner panel 12, the parts correspond to the extending parts 62, 63. This makes it possible to preferably increase the door rigidity using the fixation parts X2, X3.

What is more, in the vehicle sliding door 10, the weld parts Y1 to Y3 where the inner panel 12 and the first reinforcement member (the sash stiffener 50 and the latch stiffener 60) are welded together are respectively provided near the fixation parts X1 to X3. This makes it possible to firmly fix the inner panel 12, the module panel 13 and the first reinforcement member together, and to preferable increase the door rigidity using the fixation parts X1 to X3 and the weld parts Y1 to Y3.

Although the foregoing descriptions have been provided for the embodiment of the present invention, the present invention is not limited to the embodiment, and may be changed depending on the necessity within a scope not departing from the gist or spirit of the present invention. For example, the sash stiffener 50 and the latch stiffener 60 may be integrated into a single member. In addition, although it is desirable that the upper and lower reinforcement members into which the first reinforcement member is divided each have at least one fixation part, either or both of them may include no fixation part. Furthermore, the first reinforcement member (the sash stiffener 50 and the latch stiffener 60) may have a configuration to reinforce a closing-direction end portion (a front end portion, in the above-discussed embodiment), as a sliding-direction end portion, of the vehicle sliding door 10.

What is claimed is:

1. A vehicle sliding door, comprising:
    an outer panel;
    an inner panel;
    a module panel to which devices are fixed;
    a first reinforcement member for reinforcing a sliding-direction end portion of the inner panel; and
    a fixation part to which the inner panel, the module panel and the first reinforcement member are fixed,
    wherein
    the module panel is provided so as to cover an opening part formed in the inner panel,
    an edge portion of the opening part at a side of the sliding-direction end portion includes a first edge part, and a second edge part which is closer to the sliding-direction end portion than the first edge part is,
    the first reinforcement member includes an extending part which extends toward the module panel corresponding to the first edge part, and
    the inner panel, the module panel, and the extending part of the first reinforcement member are fixed to the fixation part.

2. The vehicle sliding door according to claim 1, comprising a plurality of the fixation parts vertically spaced apart from each other.

3. The vehicle sliding door according to claim 1, wherein the first reinforcement member is divided into upper and lower parts.

4. The vehicle sliding door according to claim 1,
    further comprising a second reinforcement member for reinforcing a part of the inner panel, the part corresponds to the extending part.

5. The vehicle sliding door according to claim 1, wherein a weld part at which the inner panel and the first reinforcement member are welded is provided in the vicinity of the fixation part.

* * * * *